UNITED STATES PATENT OFFICE 2,647,629

FLOTATION OF URANIUM

Preston L. Veltman, Severna Park, Md., assignor to the United States of America as represented by the United States Atomic Energy Commission No Drawing. Application August 25, 1950, Serial No. 181,563

1 Claim. (Cl. 209—166)

This invention relates to the recovery of mineral values from ores and the like and, more particularly, to the recovery of uranium values by an improved flotation procedure.

Uranium values can be recovered by a flotation procedure wherein the sole flotation agent used is chosen from the class consisting of anionic and non-ionic synthetic detergents and soluble salts of fatty acids and rosin acids. However, while uranium values can be recovered from gangue materials by that process, only part of the uranium values present can be so separated within a practical length of time, and the recovery of the said values from the froth by means of which they are separated from gangue is tedious, difficult and expensive inasmuch as large quantities of organic solvents are required in the breaking of the froth when those synthetic detergents especially suited to the recovery of uranium materials are used as frothing agents, or special high-pressure sprays or quantities of acid are required in order to break the foam of less effective soaps.

It is an object of this invention to provide an improved flotation procedure for the recovery of uranium values from ores and the like.

It is another object of this invention to provide an improved flotation procedure for the recovery of uranium values from ores and the like wherein the froth by means of which the uranium values are separated is readily broken.

It is still a further object of this invention to provide a method for the recovery of uranium values from ores and like materials wherein substantially all of the uranium values may be recovered by means of a simple and expeditious process.

It is a still further object of this invention to provide a method for recovering uranium values from artificial ore-like materials such as earth materials containing uranium oxides and the like which have been inadvertently spilled thereon, earth materials containing uranium values scattered therein during testing procedures, or uranium values recovered from fluid systems by a sand-filter or the like.

Other objects and advantages will become apparent from the description and examples which follow.

The process of this invention is carried out by using, in a conventional flotation procedure, an agent consisting of a material chosen from the class of anionic and non-ionic synthetic detergents together with a material chosen from the class of soluble salts of fatty acids and rosin acids. By means of such a combination of flotation agents, it has been found that substantially 90 per cent or more of the uranium values in an ore may conveniently be recovered and that the foam, by means of which these uranium values are separated from the gangue materials, may readily be broken by conventional techniques, such as the use of water sprays or dilute acids.

In carrying out the process of this invention, conventional flotation procedures may be used providing the flotation agent of this invention is employed without the usual addition agents. While the addition of such other materials as conditioners, promoters, frothers or depressants may be employed, they have not been found to contribute materially to the results obtained by the use of the single combination flotation agent of the synthetic detergent together with the soap. While the supplementary agents in general have not been found to interfere severely with the process of the invention, neither have they been found to make any contribution to the process.

Steps in the conventional flotation procedure usually comprise wet grinding and classifying the material to be treated; adding, to this intimate mixture of water and finely divided ore materials, one or more flotation agents; permitting adequate contact to be established between the agent and the particles; agitating the pulp; forming froth thereon, usually by passing air through a body of pulp; separating the froth; and breaking the froth to recover the mineral values therefrom. Any convenient apparatus suitable for such flotation procedure may be used in carrying out the process of this invention.

In the examples which follow, two different types of apparatus are described: (1) A single cell batch flotation unit used for testing purposes and, (2) an eight-cell continuous flotation unit in which recovery of the mineral values from the ore is effected on a continuous basis, each cell serving to refine the tailings from the preceding cell until substantially complete removal of the uranium values from the ore has been effected.

In any flotation procedure, it is well-established that the specification of optimum concentration of the flotation agent cannot be made without detailed consideration of the particular ore material and mineral values to be separated.

In general, in carrying out the process of this invention, satisfactory results are obtained by using the concentration of agent which is determined to be slightly above the minimum concentration necessary for maintaining frothing on the pulp in question. The usual amount is of the order of 0.1 pound to 10 pounds of flotation agent per ton of ore material. However, the behavior of particular ore materials varies. In order to secure best results, it may be necessary to establish the exact ratio of synthetic detergent to soap which gives the most satisfactory recovery and the most easily broken foam, and to establish the amount of combined frothing flotation agent which is most effective. As indicated above, in general, this concentration lies just above that minimum concentration necessary to affect frothing. The use of smaller or larger amounts of flotation agent often leads to less satisfactory results; the use of more flotation agent, in addition, is wasteful and uneconomical. It should be further pointed out that the use of a thick pulp is often conducive to obtaining a satisfactory result with smaller amounts of flotation agent.

As is well-known in the mineral dressing art, advantage may be taken of the differing response to grinding procedures, of the different constituents of ore materials. Many ores materials contain some components which are softer or more easily broken down than others. If the softer components are desired materials, they may be conveniently recovered at an appropriate size, from the coarser gangue, or, as undesired materials, they may be ground so finely as to be left behind more readily, especially in a flotation procedure.

Other process variables in the flotation procedure may also affect the success thereof. The use of elevated temperatures, the use of soft water, and the allowing of adequate contact between the flotation agent and the pulp to be treated are all well-known in the art. A general and explicit description of surface active agents may be found in "Surface Active Agents" by Schwartz and Perry, published in 1949 by Interscience Publishers, Inc., New York. In particular, the class of non-ionic detergents and the type herein characterized as "polyethylene oxide-type" or "polyethylene oxide-phenol type" is described and delimited on pages 202 ff. of this referenced publication.

Example I

To a single cell batch flotation unit comprising a flotation box, an air supply on the bottom thereof, an agitator and a foam-removing paddle, there is charged 3.5 liters of water containing 0.1 gram of ethylene oxide polymer condensed with a phenol nucleus and 0.22 gram of sodium salt of mixed fatty acid, the fatty acids comprising mainly stearic acid, together with 1000 grams of gangue material which is shown by analysis to contain 25 grams of uranium oxide ($U_3O_8$). Flotation procedure is initiated. In five minutes, 67 per cent of the uranium value has been recovered in the froth and, after thirty minutes, better than 99 per cent of the uranium value has been recovered in the froth. The froth, by means of which the mineral values are recovered, is readily broken by the use of dilute acids or by the use of a high-pressure spray of water alone.

Example II

To the apparatus of Example I containing a charge of 1000 grams of gangue material which is shown by analysis to contain 20 grams of uranium dioxide ($UO_2$), there is added 3.5 liters of solution containing 14 milligrams of polyethylene oxide-phenol detergent and 170 milligrams of sodium oleate per liter. Flotation is carried out. In the froth that is floated during the first five minutes, there is recovered 95 per cent of the uranium value and, at the end of thirty minutes, better than 99 per cent of the uranium values have been recovered in the easily-broken froth.

Example III

The apparatus of the preceding example is operated with a charge of 1 kilogram of gangue material containing 25 grams of mixed uranium oxides and a solution containing per liter 25 milligrams of sodium dodecylbenzenesulfonate and 150 milligrams of commercial red oil neutralized with caustic soda. Flotation procedure gives a recovery of about 95 per cent of the uranium values in thirty minutes.

Example IV

An eight-cell continuous flotation unit wherein each cell has a capacity of 1 cubic foot is employed in the continuous operation to separate uranium oxide from gangue materials. The flotation agent, polyethylene oxide-phenol detergent, 1 part, with refined tallow soap, 2.2 parts, is maintained at a concentration just slightly above that necessary to maintain a froth on the system. No modifiers, promoters or depressants are used. Uranium oxide-sand material (1:3200) is fed at the rate of 200 pounds per hour to the operating system, water is re-circulated at the rate of about 4 gallons a minute around the entire system, and air is blown through each cell at an approximate rate of 1 cubic foot per minute. Somewhat better than 90 per cent of the uranium values are recovered with an average gangue flotation of about 1.2 per cent. Expressed in a different fashion, better than 90 per cent of the uranium values charged to the system are recovered together with about 1/85 of the original undesired material with which the uranium values were mixed.

Example V

In a similar run with the same material where the uranium values were present to the extent of 1 part of uranium oxide to 2000 parts of gangue material, 85 per cent of the total uranium charge is recovered. The gangue flotation is approximately seven-tenths of 1 per cent, representing almost a one hundred forty fold reduction in gangue material.

The foregoing examples are given by way of illustration only and are not to be considered as limiting in any way upon the scope of the invention. The invention is not to be limited except as indicated in the appended claim.

What is claimed is:

The process of recovering uranium values from ores and like materials which comprises pulping the finely divided material with water, adding a polyethylene oxide-phenol detergent and a sodium salt of at least one fatty acid, and subjecting said pulp to flotation procedure whereby uranium values are concentrated in the froth and may be recovered therefrom.

PRESTON L. VELTMAN.

References Cited in the file of this patent

UNITED STATES PATENTS

| Number | Name | Date |
|---|---|---|
| 1,337,548 | Edser | Apr. 20, 1920 |
| 2,000,656 | Armstrong | May 7, 1935 |
| 2,012,609 | Lenher | Aug. 27, 1935 |
| 2,498,656 | De Groote | Feb. 28, 1950 |

OTHER REFERENCES

Schwartz et al., Surface Active Agents, pp. 202 and 203 (1949). Published by Interscience Publication, Inc., New York, New York.